United States Patent [19]

Jungesjö

[11] 4,282,782

[45] Aug. 11, 1981

[54] METHOD OF MAKING ROTARY DIE RACKS

[75] Inventor: Harald N. Jungesjö, Rochester, Mich.

[73] Assignee: Anderson-Cook, Inc., Fraser, Mich.

[21] Appl. No.: 56,161

[22] Filed: Jul. 10, 1979

[51] Int. Cl.$^3$ ............................................. B21K 5/20
[52] U.S. Cl. ................................................. 76/107 R
[58] Field of Search ............ 76/107 R, 101 A, 101 R, 76/4; 82/1 C, 34 R; 29/27 C, 564

[56] References Cited

U.S. PATENT DOCUMENTS

| 1,440,931 | 1/1923 | Oliver | 76/101 A |
| 4,045,988 | 9/1977 | Anderson | 72/108 |

*Primary Examiner*—Roscoe V. Parker
*Attorney, Agent, or Firm*—Reising, Ethington, Barnard, Perry & Brooks

[57] ABSTRACT

A method and apparatus for making rotary die racks having an elongated shape including a partially circular forming face of less than 180° and a flat mounting surface that faces in the opposite direction as the forming face. Cast metal blanks of the die racks are secured to a rotatable spindle in a side-by-side relationship to turn the forming faces. Forming projections, i.e. teeth that extend parallel to the axis of the forming face, are then cut in the turned face. Heat treating of the die racks is then performed before mounting thereof on a fixture to perform a finish grinding of the teeth. The spindle preferably includes a spindle member and a central shaft on which the spindle member is mounted for rotation. The fixture includes a pair of spaced end plates and a bed that extends between the end plates and has a stop and an adjustable positioner for clamping the die racks.

6 Claims, 6 Drawing Figures

METHOD OF MAKING ROTARY DIE RACKS

TECHNICAL FIELD

This invention relates to a method and apparatus for making rotary die racks having an elongated shape including a partially circular forming face of less than 180° and also including a flat mounting surface that faces in the opposite direction as the forming face.

BACKGROUND ART

U.S. Pat. No. 4,045,988, which is assigned to the assignee of the present invention, discloses a rotary forming machine wherein a pair of spaced tool spindles mount rotary die racks having partially circular forming faces for forming a workpiece mounted on a workpiece spindle between the tool spindles. During driving rotation of the tool spindles, the forming faces on cooperable pairs of the die racks engage the workpiece in a 180° opposed relationship to provide forming of teeth or splines in the workpiece by a rolling operation. Each die rack has a mounting surface that faces in the opposite direction as the forming face engaged with a tool spindle support surface which is oriented in a radial direction with respect to the axis of the associated tool spindle rotation.

Precise forming of workpieces with the rotary machine described above requires that the forming face of each die rack on the tool spindles be accurately located with respect to the mounting surface thereof which is engaged with the tool spindle. Also, it is of course necessary to manufacture the die racks with the accurately located forming faces and mounting surfaces as economically as possible in order to minimize the cost of the resultant formed pieces made by the machine.

DISCLOSURE OF THE INVENTION

An object of the present invention is to provide a method and apparatus for making rotary die racks having an elongated shape including a partially circular forming face of less than 180° and also including a flat mounting surface that faces in the opposite direction as the forming face.

A die rack made according to the method is first cast as a metal blank and then secured to a rotatable spindle with the mounting surface thereof engaged with the spindle. Rotation of the spindle while cutting the blank forms the partially circular forming face of the die rack by a turning operation with the forming face and the mounting surface accurately located relative to each other. Forming projections are then cut in the turned face of the die rack.

The forming projections are preferably cut as teeth that extend parallel to the axis about which the forming face is generated and at least some of the teeth are cut to include cut sides and a tip which is formed from the turned face. In one embodiment, all of the teeth on the forming face have the same size. Another embodiment of the die rack has teeth of a progressively increasing size from a leading end of the rack to a trailing end of the rack. In both embodiments, the die rack is heat treated after the teeth are cut and the teeth are finish ground after the heat treating.

Preferably, the metal blanks of the die racks are mounted in a side-by-side relationship on the spindle during the turning of the forming faces. Economy and uniformity of size are achieved by securing a plurality of pairs of the blanks to the spindle with the pairs of the blanks spaced circumferentially from each other about the axis of spindle rotation. After heat treating of the die racks with the teeth formed therein, the pairs of die racks are mounted on a fixture in a side-by-side relationship with the teeth aligned laterally and the teeth are then finish ground by passes of a grinding wheel along the complete width of the side-by-side mounted die racks.

The spindle utilized in making the rotary die racks includes a plurality of flat support surfaces spaced circumferentially about the axis of spindle rotation facing outwardly in a radial direction. Each support surface has an axial dimension along the axis of rotation great enough to support a pair of the die rack blanks thereon in the side-by-side relationship. Securement of the pairs of die rack blanks to the associated support surfaces with the mounting surface of each blank engaged with the support surface on which it is mounted and subsequent spindle rotation while cutting the blanks forms the partially circular forming faces in which the teeth are then cut.

In its preferred construction, the spindle includes a spindle member on which the support surfaces are provided and a shaft that extends through a central opening in the spindle member. Each support surface on the spindle member has an end wall utilized to secure the associated pair of die rack blanks during turning of the forming faces on the blanks. As disclosed, there are three support surfaces on the spindle member equally spaced circumferentially with respect to each other forming the general shape of an equilateral triangle whose vertices are cut off.

A shoulder on the shaft engages the spindle member axially from one direction while a locknut on the shaft engages the spindle member from the other direction. Cooperation between the shaft shoulder and locknut limits axial movement of the spindle member on the shaft. A key extends between the shaft and the spindle member to rotatably couple the spindle member with the shaft.

The fixture utilized to mount the die racks for grinding of the teeth includes a pair of spaced end plates and has a rotational axis that extends through the end plates. A bed of the fixture extends between the end plates and includes a support surface spaced from the rotational axis oriented in a radial direction with respect thereto facing outwardly. A fixed stop on the bed adjacent one end plate thereof and an adjustable positioner on the bed spaced from the stop toward the other end plate cooperate to provide a means for clamping a plurality of pairs of the die racks on the bed in a side-by-side relationship with the flat mounting surfaces of the blanks engaging the support surface of the bed. Mounting of the die racks on the bed by the stop and the adjustable positioner locates the forming faces of the racks in an outwardly facing radial orientation relative to the rotational axis for the grinding operation on the teeth.

Preferably, the adjustable positioner of the bed includes a lug on the bed and a threaded member adjustably positioned on the lug. The lug may also be adjustably positioned on the bed to accommodate for a different number of die racks mounted thereon to be ground.

The bed includes a flange that extends perpendicular to the support surface and is connected to the end plates. A support also extends between the end plates spaced from the bed and flange thereof to provide reinforcement to the fixture during the grinding operation.

Spacing of the bed and the support of the fixture on opposite sides of the rotational axis enhances the reinforcement provided to the fixture between the end plates.

The fixture can be used to mount the die racks for rough grinding of the teeth before heat treating as well as for finish grinding of the teeth after the heat treating.

The objects, features, and advantages of the present invention are readily apparent from the following detailed description of the best mode for carrying out this invention taken in connection with the accompanying drawings.

BEST MODE FOR CARRYING OUT THE INVENTION

Figure 1:
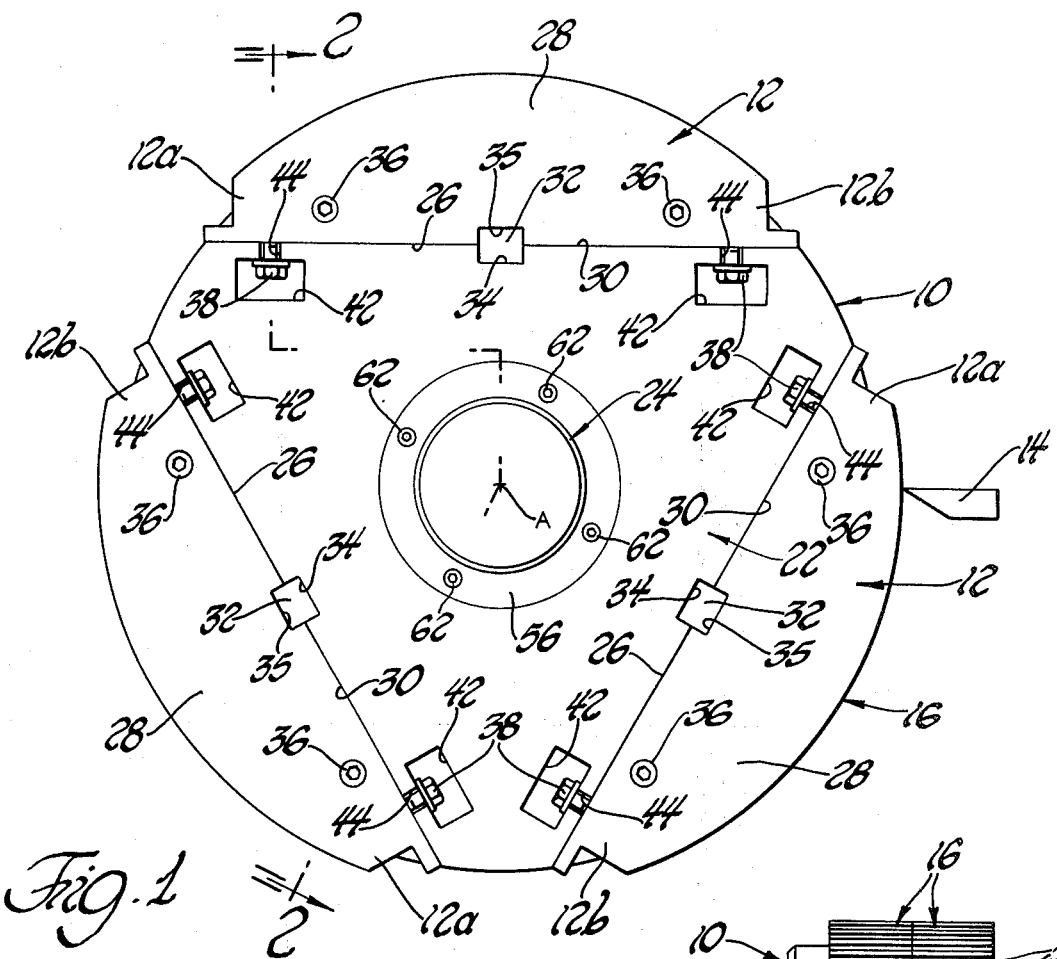
FIG. 1 is an end view of a spindle constructed according to the present invention and utilized according to the method thereof to turn partially circular forming faces on rotary die racks.
Figure 2:
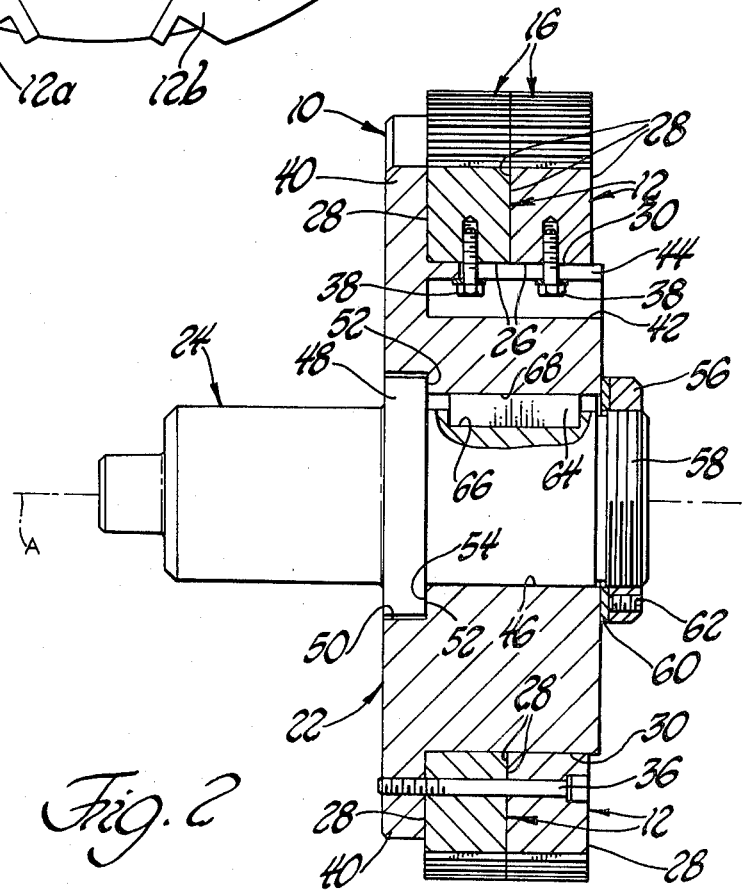
FIG. 2 is a sectional view through the spindle taken generally along line 2—2 of FIG. 1.
Figure 3:
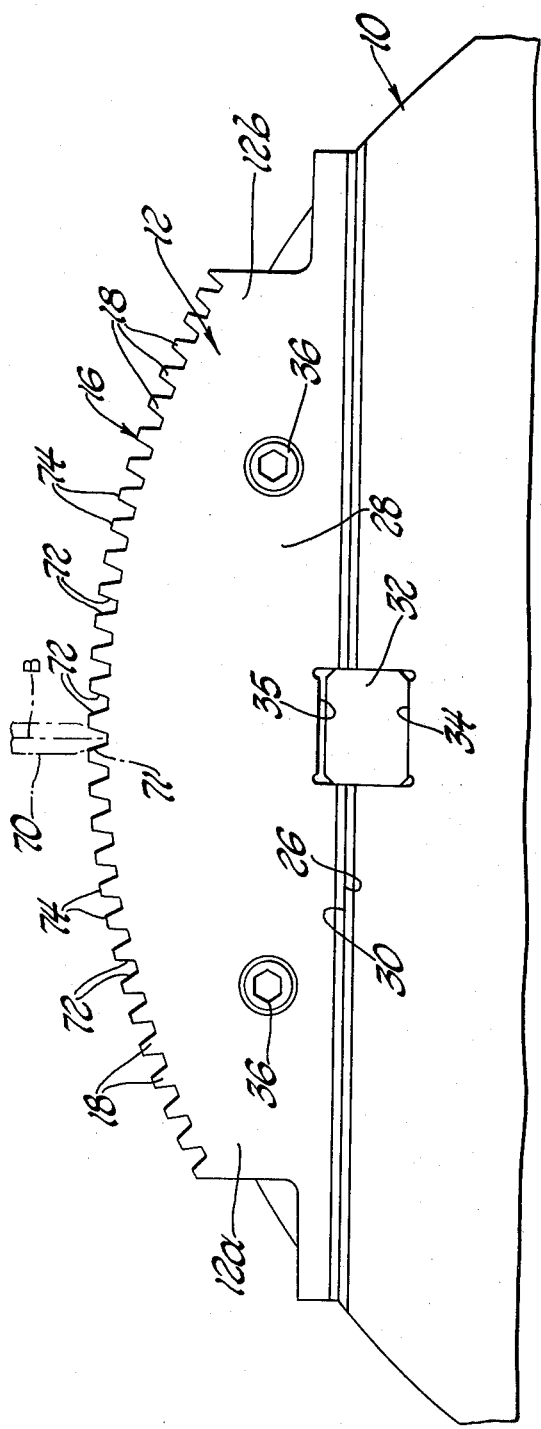
FIG. 3 is a partial end view of the spindle illustrating the manner in which equal sized teeth are cut in one embodiment of the die rack.
Figure 4:
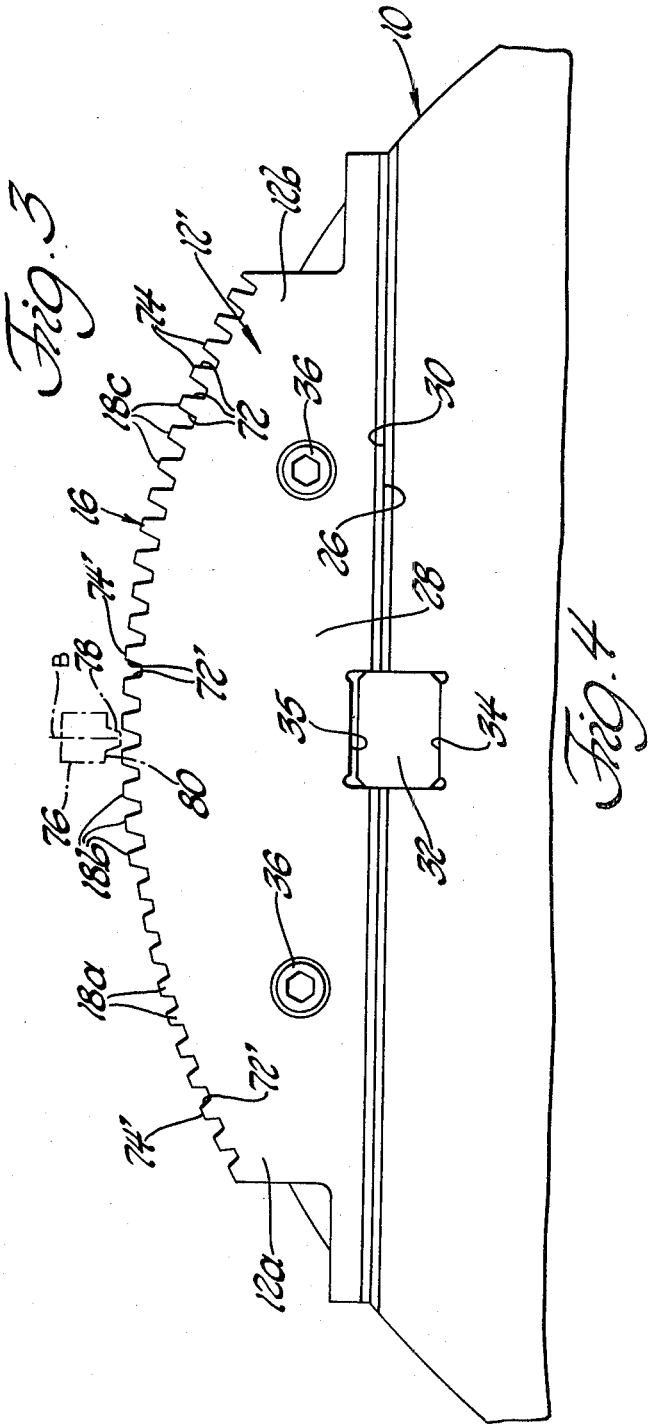
FIG. 4 is a view similar to FIG. 3 illustrating the manner in which different size teeth are cut into another embodiment of the die rack.
Figure 5:
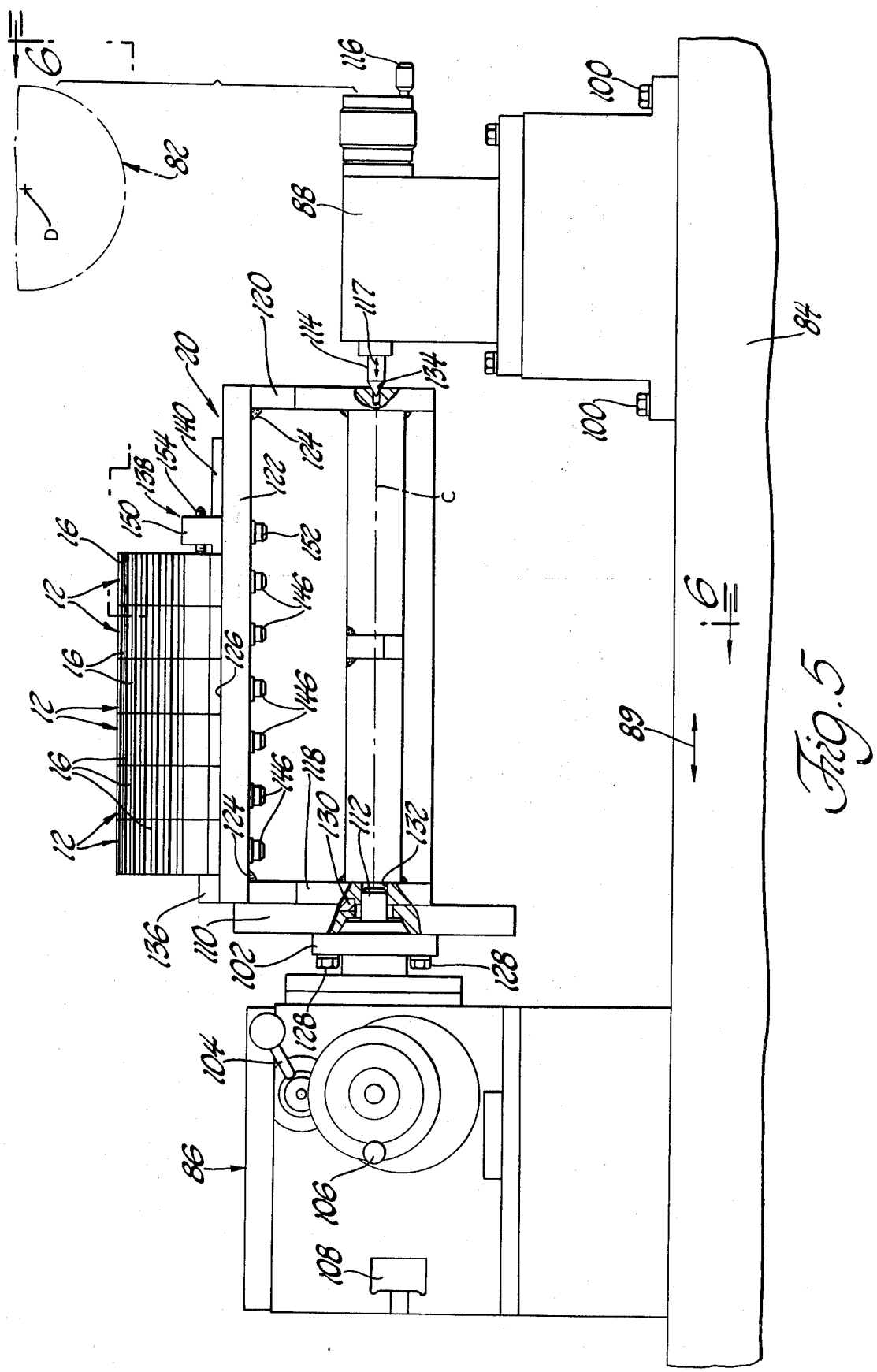
FIG. 5 is a side view of a fixture utilized to mount the rotary die rack for grinding.
Figure 6:
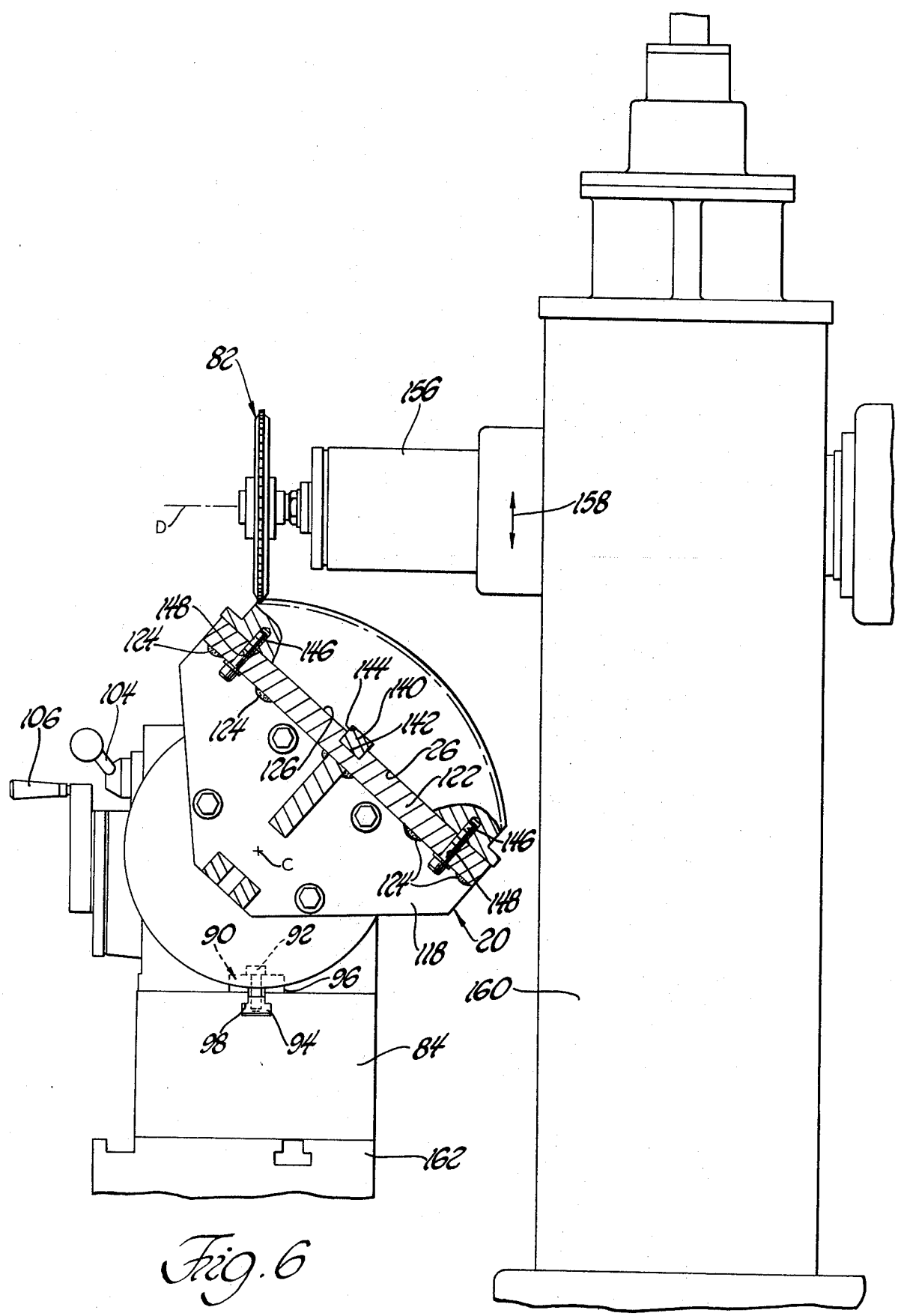
FIG. 6 is a sectional view through the fixture taken generally along line 6—6 of FIG. 5.

A spindle indicated generally by 10 in FIGS. 1 and 2 is constructed according to the present invention and utilized in the method thereof to make rotary die racks 12. Rotation of the spindle along a central axis A thereof while cutting cast metal blanks of the die racks with a cutting tool 14 forms the racks with partially circular forming faces 16 in which forming projections such as the teeth 18 (FIG. 2) are subsequently machined. As will be more fully hereinafter described, the teeth 18 may all have the same size as shown by the die rack embodiment 12 in FIG. 3 or the teeth may be machined as shown by FIG. 4 in groups of progressively increasing size from the teeth 18a at the leading end of the rack through the intermediate-size teeth 18b to the largest teeth 18c at the trailing end of the rack. After the teeth are cut, the die racks are heat treated and a fixture 20 shown in FIGS. 5 and 6 is then utilized to mount the racks for a finish grinding operation. It should also be noted that the fixture 20 may be utilized to mount the die racks for a rough grinding operation which forms the teeth rather than mounting the racks on the spindle 10 as shown in FIGS. 3 and 4 for rough machining of the teeth.

Referring back to FIGS. 1 and 2, the spindle 10 includes a spindle member 22 and a shaft 24 for mounting the cast metal blanks of the die racks 12 for turning of the forming faces 16. Any suitable casting process may be used to cast the blanks, such as by die casting or sand casting, etc., from a suitable tool steel. Each die rack has an elongated shape between the leading end 12a thereof and the trailing end 12b and has a flat mounting surface 26 that faces in the opposite direction as the turned forming face 16. Mounting surface 26 of each die rack extends between the leading and trailing ends thereof and is connected with the forming face 16 by spaced side walls 28 that are parallel to each other. Prior to mounting on the spindle 10, the cast blanks of the die racks may have their mounting surfaces 26 machined to true the flatness and smooth the surface finish thereof from the cast surface condition.

Spindle member 22 includes a plurality of circumferentially spaced support surfaces 30, three as shown in FIG. 1, which are engaged by the die racks 12 upon mounting thereof on the spindle. Each support surface 30 has the same length as the die racks 12 and is oriented radially with respect to the axis A of spindle rotation facing in an outward direction. Intermediate the ends of each support surface 30, a projection 32 is received within a depression 34 in the spindle member 22 and suitably fixed thereto such as by recessed bolts which are not shown. Projection 32 is also received within a depression 35 in the mounting surface 26 of the mounted die rack 12. Projection 32 cooperates with sets of bolts 36 and 38 to fix pairs of the die rack blanks on the spindle member support surfaces 30 for turning of the forming faces 16. Each support surface 30 has an axial length along the axis A, as best seen in FIG. 2, which is sufficient to allow a pair of the die rack blanks 12 to be mounted thereon in the side-by-side relationship shown.

Spindle member support surfaces 30 as seen in FIG. 1 are equally spaced circumferentially about the axis A with respect to each other and form the general shape of an equilateral triangle whose vertices are cut off. Adjacent each support surface 30, the spindle member 22 includes an end wall 40 (FIG. 2). Bolts 36 extend through the side-by-side die rack blanks 12 and are threaded into the adjacent end wall 40 as shown by the lower portion of FIG. 2 to prevent axial movement of the die rack blanks on the spindle member 22. An opening 42 in the spindle member 22 adjacent each end of the support surfaces 30 opens to one side of the spindle member and includes an elongated slot that also opens to the same side of the spindle member. Bolts 38 extend upwardly through slots 44 and are threaded into the die rack blanks 12 to provide securement thereof to the spindle member against outward movement. Mounting surface 26 of each die rack 12 is maintained in engagement with the associated spindle support surface 30 by bolts 38.

By turning the forming faces 16 on pairs of the die rack blanks 12 mounted in the side-by-side relationship shown, economy in manufacturing the die racks is achieved as well as uniformity in spacing the forming faces with respect to the mounting surfaces 26 of the blanks. This uniformity in spacing the forming faces allows precision in manufacturing the workpieces which are formed by the completed die racks on a machine of the type shown in the aforementioned U.S. Pat. No. 4,045,988 which is hereby incorporated by reference.

As seen in FIG. 2, the spindle shaft 24 is received within a central opening 46 of the spindle member 22 extending therethrough so as to support the spindle member for rotation along axis A. Shaft 24 includes an annular flange 48 that is received within a round depression 50 at the left end of the spindle opening 46. An annular shoulder 52 of the flange 48 faces axially to the right and is seated against the spindle member 22 at a leftward facing axial surface 54 in the depression 50 so as to prevent axial movement of the spindle member to the left with respect to the shaft. A locknut 56 is received by the threaded right end 58 of the shaft and compresses a lock washer 60 against the left side of the spindle member about the opening 46. Circumferentially spaced bolts 62 are threaded through the locknut 56 and engage the washer 60 so as to prevent loosening of the locknut. A key 64 between the flange 48 and the locknut 56 is received within a key slot 66 in the shaft 24 and within a key slot 68 in the spindle member 22 so as to rotatably couple the spindle member to the shaft. Mounting of the shaft 24 on a suitable turning machine with the spindle member 22 mounted on the shaft allows the turning faces of the cast metal die rack blanks 12 to be turned as the cutting tool 14 of the turning machine is moved axially along the direction of axis A during the spindle rotation.

After turning of the forming faces 16 on the die rack blanks, the rough shapes of the teeth 18 are then cut into the forming faces. The die rack teeth may be cut with an involute shape or any other required shape by a milling operation such as shown in FIGS. 3 and 4 or by a conventional gear grinding operation. As shown in FIG. 3, a milling cutter 70 whose axis of rotation B is oriented radially with respect to the direction of spindle rotation has a tapered end 71 which cuts the sides 72 of the teeth while the tips 74 thereof are formed from the turned forming face. Spindle 10 is mounted and indexed with respect to the milling cutter 70 to provide proper alignment for cutting the teeth. Milling cutter 70 is moved axially with respect to the axis of spindle rotation during the milling operation to form the teeth 18 with the teeth extending parallel to the axis of spindle rotation.

The teeth of the die rack 12' shown in FIG. 4 are cut into the forming face 16 in groups 18a, 18b, and 18c of progressively increasing size from the leading end 12a of the rack to the trailing end 12b. Each of the smaller teeth 18a and intermediate teeth 18b has a shape from the tip 74' thereof along the cut sides 72' thereof that is congruent to the shape of the largest teeth 18c. A milling cutter 70 such as shown in FIG. 3 is used to cut the largest group of teeth 18c so that the tips 74 thereof are formed from the turned forming face 16 and the sides 72 thereof are cut by the end of the milling cutter. A milling cutter 76 is used to cut the teeth 18b and is moved axially to cut the tips 74' thereof and the sides 72' thereof extending parallel to the axis of spindle rotation. This milling cutter 76 is rotated about the axis B which extends radially to the axis of spindle rotation and has a tapered end 78 that cuts the sides of the teeth and an end face 80 that cuts the tips of the teeth. A milling cutter similar to cutter 76 is used to cut the smallest group of teeth 18a. The tip centers of all of the teeth 18a, 18b, and 18c are spaced circumferentially from each other the same distance but, the tips of the teeth have progressively increasing radii from the axis of spindle rotation moving from one tooth group to the next alphabetically so that the die racks can be used to perform a tooth forming operation that proceeds in a progressive manner.

After the die rack blanks have their forming faces 16 turned as described in connection with FIGS. 1 and 2 and after the rough cutting of the teeth such as described in connection with FIGS. 3 and 4, the die racks are heat treated in a suitable manner to harden the steel from which the blanks are cast.

With reference to FIGS. 5 and 6, the heat treated die racks are mounted on the fixture 20 for finish grinding of the teeth by a grinding wheel 82. A slide table 84 mounts a digital headstock positioner 86 and a tailstock 88 to rotatably support the fixture along an axis C. Slide table 84 is movable to the left and right with respect to the grinding wheel 82 along the directions shown by arrows 89. Grinding wheel 82 is rotatably supported about an axis D which is perpendicular to a vertical plane through the axis C. Movement of the slide table 84 to the right as viewed in FIG. 5 moves the fixture 20 under the grinding wheel 82 so that aligned sets of teeth on the die rack can be ground by a single movement of the table.

As seen in FIG. 6, the headstock positioner 86 is mounted on the slide table 84 by one or more connections 90 including a bolt 92 that is threaded into a slide 94 through a lug 96 on the positioner. Tightening of the bolt 92 into the slide 94 which is received within a slot 98 in the table 84 prevents movement of the positioner along the length of the table to the right or the left as in FIG. 5. Likewise, tailstock 88 includes similar bolt connections 100 (FIG. 5) that position the tailstock along the slide table against movement to the left or the right.

Headstock positioner 86 includes a spindle 102 whose rotatable position about axis C is controlled by a coarse positioner handle 104 and a fine positioner handle 106. The rotatable position of the spindle 102 about axis C can be read at a digital output screen 108. Spindle 102 includes a face plate 110 and a stub shaft 112 that cooperate with a dead center 114 of the tailstock 88 to mount the fixture 20. Tailstock 88 includes a rotatable handle 116 that moves the center 114 to the left or the right as shown by arrows 117 for mounting and removal of the fixture 20.

Fixture 20 includes a pair of end plates 118 and 120 spaced axially from each other along axis C as seen in FIG. 5. A bed 122 of fixture 20 extends between the end plates 118 and 120 and is secured thereto in any suitable manner such as by welds 124. Bed 22 has a flat support surface 126 (FIG. 6) oriented radially with respect to the axis C facing in an outward direction and mounts the three pair of die racks 12 in a side-by-side relationship, in a manner that is more fully hereinafter described, with the mounting surfaces 26 of the die racks engaged with the bed support surface.

Face plate 110 as shown in FIG. 5 is secured to the spindle 102 of the headstock positioner by bolts 128 and includes a key 130 that rotatably couples the fixture end plate 118 to the face plate. Shaft 112 of spindle 102 is received within a hole 132 of end plate 118 so as to rotatably support this end plate along axis C. Likewise, a tapered hole 134 of the end plate 120 receives the dead center 114 upon movement thereof to the left by driving rotation of handle 116 so as to support this end plate along axis C.

A fixed stop 136 of the bed 122 is located adjacent the fixture end plate 118 as shown in FIG. 5 and cooperates with an adjustable positioner 138 to provide a means for clamping the three pairs of die racks 12 on the bed support surface 126 in a laterally aligned relationship with each other. A projection 140 (FIG. 6) of bed 122 is fixed within a depression 142 in the bed by a number of bolts (not shown) and is also received within depressions 35 of the die racks 12 so as to provide a laterally aligned relationship thereof. Bolts 146 extend through holes 148 in the bed and secure the die racks to the bed with the rack mounting surfaces 26 engaged with the bed support surface 126 so as to accurately locate the rack teeth with respect to the bed support surface. Bolt holes 148 through the bed preferably are slightly elongated along the direction of axis C so as to permit the adjustable positioner 138 to clamp the die racks 12 in engagement with each other while allowing some tolerance for the width of the racks. A lug 150 of positioner 138 is secured to the bed 122 by a bolt 152 and receives a threaded member 154 which is rotated to engage the die rack farthest to the right and provide the clamping in cooperation with the fixed stop 136. Rotation of threaded member 154 in the opposite direction unclamps the die racks to permit them to be removed from the fixture. Holes spaced along the bed 122 allow the lug 150 and securement bolt 152 thereof to be positioned to the right or the left in order to adjust the position for clamping of a different number of die racks 12 to be ground.

With the die racks 12 mounted on the fixture 20 as previously described, the headstock positioner 86 is operated to rotatably position the fixture about axis C and align the grinding wheel with a set of laterally aligned teeth on the die racks. Slide table 84 is then actuated to move the fixture to the right beneath the grinding wheel 82 for a pass which grinds the aligned teeth on the racks. Movement of the fixture back toward the left and subsequent rotation of the fixture by the positioner 86 then aligns the grinding wheel with the next set of aligned teeth ready for another pass of the grinding wheel upon table movement to the right. Grinding wheel 82 is mounted on a carriage 156 that is movable vertically as shown by arrows 158 to permit grinding of die racks 12 whose forming faces have different radii. An upwardly projecting base portion 160 supports the carriage 156 in a suitable manner for its vertical movement and is fixedly secured with respect to the base 162 on which the slide table 84 is movable.

It should be noted that in finish grinding die racks having the equally sized teeth such as shown in the die rack embodiment of FIG. 3, it is possible to grind all of the teeth with a single grinding wheel. Sides 72 of the adjacent teeth will be ground by each pass of the grinding wheel and the fixture is indexed between each pass to align the wheel with the next adjacent set of teeth without any adjustment of the wheel. However, in grinding the teeth 18a and 18b of the die rack embodiment 12' shown in FIG. 4, it is necessary to adjust the wheel with respect to the position utilized to grind the larger teeth 18c. Also, if the same wheel is to be utilized, only one side 72' of the aligned smaller teeth can be ground during each pass. Different grinding wheels having the appropriate profiles can be used to grind the smaller groups of teeth so as to enable adjacent tooth sides to be ground during each pass.

It should be also appreciated that the die racks can be mounted on the fixture 20 for a rough grinding of the teeth instead of milling the teeth while mounted on the spindle 10 in the manner previously described.

While the preferred mode for practicing the present invention has herein been described in detail, those familiar with this art will recognize various alternative embodiments and methods for practicing the present invention as described by the following claims.

What is claimed is:

1. A method for making a pair of rotary die racks each of which has an elongated shape including a partially circular forming face of less than 180° and a flat mounting surface that faces in the opposite direction as the forming face, the method comprising: casting a pair of metal blanks of the die racks; securing the pair of cast blanks of the die racks to a rotatable spindle in a side-by-side relationship with the mounting surfaces thereof engaged with the spindle; turning the forming faces of both blanks by rotating the spindle while cutting the blanks to form the partially circular shape of the forming face of each blank at the proper location relative to the mounting surface thereof and in a uniform relationship with respect to the other blank; and subsequently cutting forming projections in the turned face of each die rack.

2. A method according to claim 1 wherein the forming projections are cut as teeth that extend parallel to the axis about which the forming face is generated and wherein at least some of the teeth are cut to include cut sides and a tip which is formed from the turned face.

3. A method as in claim 1 or 2 wherein the die rack is heat treated after the forming projections are cut and wherein the forming projections are finish ground after the heat treating.

4. A method for making a pair of rotary die racks each of which has a partially circular forming face of less than 180° and which also has a flat mounting surface that faces in the opposite direction as the forming face, the method comprising: casting a pair of metal blanks of the die racks; securing the pair of cast blanks of the die racks to a rotatable spindle in a side-by-side relationship with the mounting surfaces thereof engaged with the spindle; turning the forming faces by rotating the spindle while cutting the blanks to form the partially circular shape of the forming face of each blank at the proper location relative to the mounting surface thereof; and subsequently cutting teeth in the forming faces extending parallel to the axis about which the forming face is generated with at least some of the teeth cut to include cut sides and a tip which is formed from the turned face.

5. A method for making a pair of rotary die racks each of which has a partially circular forming face of less that 180° and which also has a flat mounting surface that faces in the opposite direction as the forming face, the method comprising: casting a pair of metal blanks of the die racks; securing the metal blanks of the die racks to a rotatable spindle in side-by-side relationship with the mounting surfaces thereof engaged with the spindle; turning the forming faces by rotating the spindle while cutting the blanks to form the partially circular shape of the forming face of each blank at the proper location relative to the mounting surface thereof; cutting teeth in the forming faces extending parallel to the axis about which the forming face is generated with at least some of the teeth cut to include cut sides and a tip which is formed from the turned face; heat treating the die racks after cutting the teeth; and finish grinding the teeth after the heat treating.

6. A method for making a plurality of pairs of rotary dies wherein each die includes a partially circular forming face of less than 180° and also includes a flat mounting surface that faces in the opposite direction as the forming face, the method comprising: casting metal blanks of the pairs of die racks; securing each pair of blanks to a rotatable spindle in a circumferentially spaced relationship to each other pair of blanks with the blank of each pair located in a side-by-side relationship to the other blank of the pair and having the mounting surface thereof engaged with the spindle; turning the forming faces by rotating the spindle while cutting the blanks to form the partially circular shape of the forming face of each die rack at the proper location relative to the mounting surface thereof; cutting teeth in each forming face extending parallel to the axis about which the forming face is generated with at least some of the teeth cut to include cut sides and a tip which is formed from the turned face; heat treating the die racks; mounting the pairs of die racks on a fixture in a side-by-side relationship with the teeth aligned laterally; and finish grinding the teeth by passes of a grinding wheel along the complete width of the side-by-side mounted die racks on the fixture.

* * * * *